(12) United States Patent
Amante et al.

(10) Patent No.: US 7,546,778 B2
(45) Date of Patent: Jun. 16, 2009

(54) FLOW METER

(75) Inventors: Philip A. Amante, Poquoson, VA (US); John K. Narney, II, Yorktown, VA (US)

(73) Assignee: Measurement Specialties, Inc., Hampton, VA (US)

( * ) Notice: Subject to any disclaimer, the term of this patent is extended or adjusted under 35 U.S.C. 154(b) by 0 days.

(21) Appl. No.: 12/021,658

(22) Filed: Jan. 29, 2008

(65) Prior Publication Data
US 2008/0178687 A1    Jul. 31, 2008

Related U.S. Application Data

(60) Provisional application No. 60/897,952, filed on Jan. 29, 2007.

(51) Int. Cl.
*G01F 1/28*    (2006.01)
(52) U.S. Cl. ................................... 73/861.75
(58) Field of Classification Search ............. 73/861.83, 73/861.78, 861.79, 261, 253, 861.77
See application file for complete search history.

(56) References Cited

U.S. PATENT DOCUMENTS

| 5,447,062 | A | 9/1995 | Kopl et al. |
| 6,089,102 | A | 7/2000 | Bloss |
| 6,196,065 | B1 * | 3/2001 | Henksmeier et al. ......... 73/261 |
| 6,250,151 | B1 * | 6/2001 | Tingleff et al. ................ 73/261 |

* cited by examiner

*Primary Examiner*—Jewel Thompson
(74) *Attorney, Agent, or Firm*—Howard IP Law Group, PC

(57) ABSTRACT

An axial flow meter includes a housing including a generally elongated body with a continuous internal bore. Two spindles are mounted parallel to one another in the housing. Each spindle has a blade on the exterior surface of the spindle. Blades on each of the two spindles engage with each other. Bearings at each end of both spindles engage the spindles. At least one of the bearings engaging each one of the spindles is fixed in a position relative to the elongated body thereby preventing axial movement of the two spindles while allowing rotational movement of the two spindles.

16 Claims, 8 Drawing Sheets

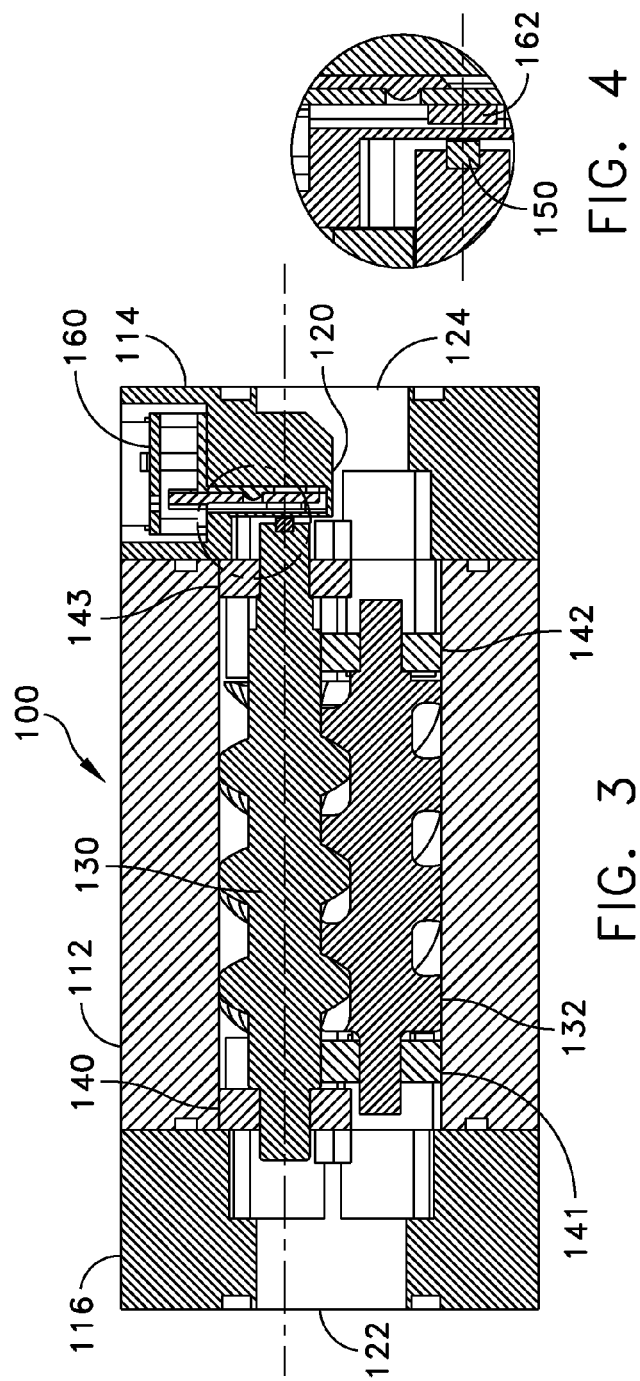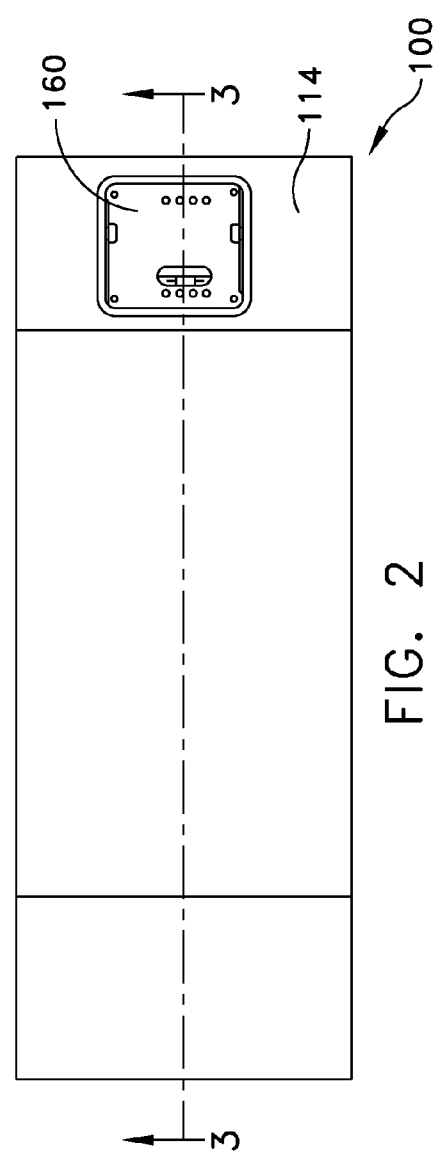

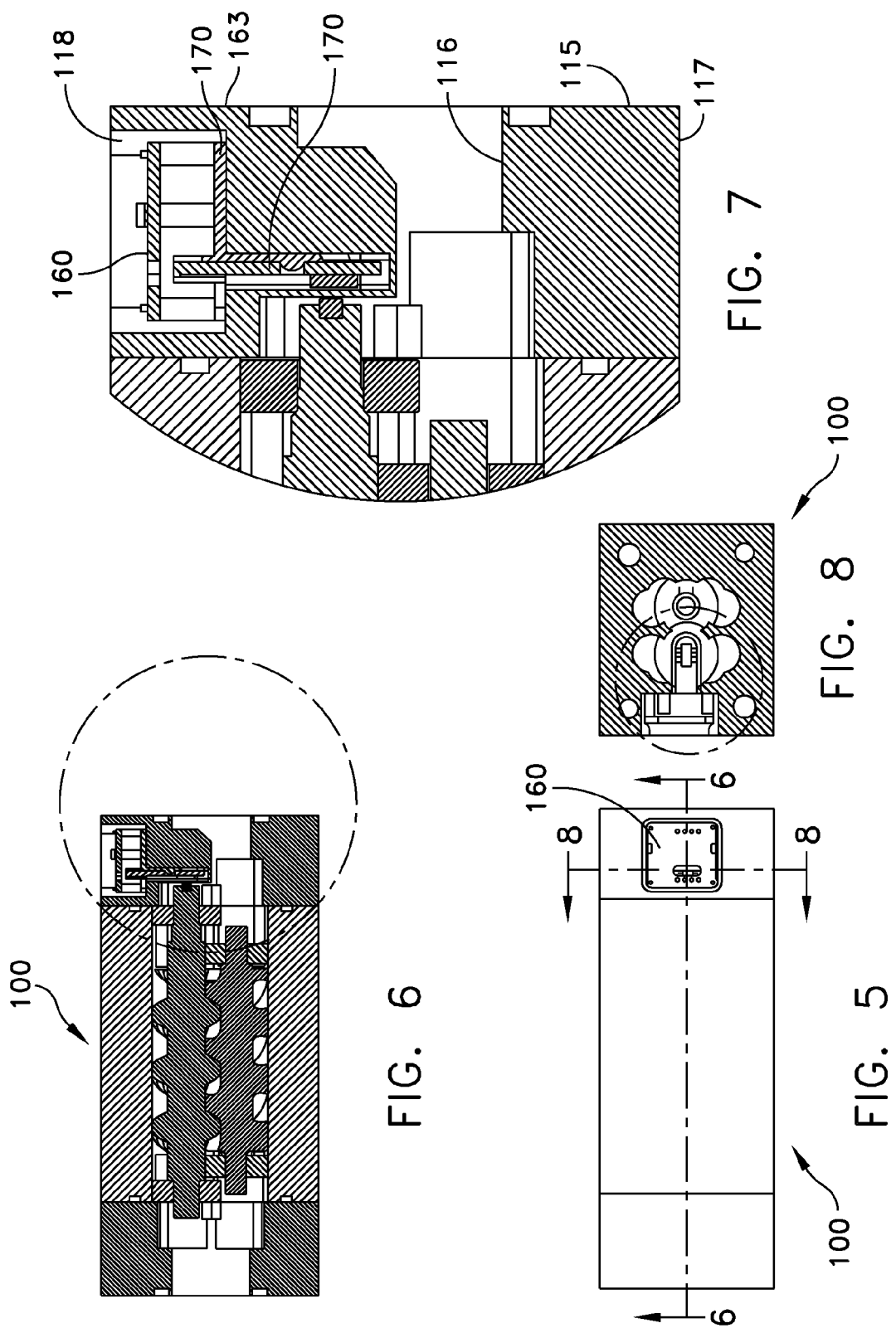

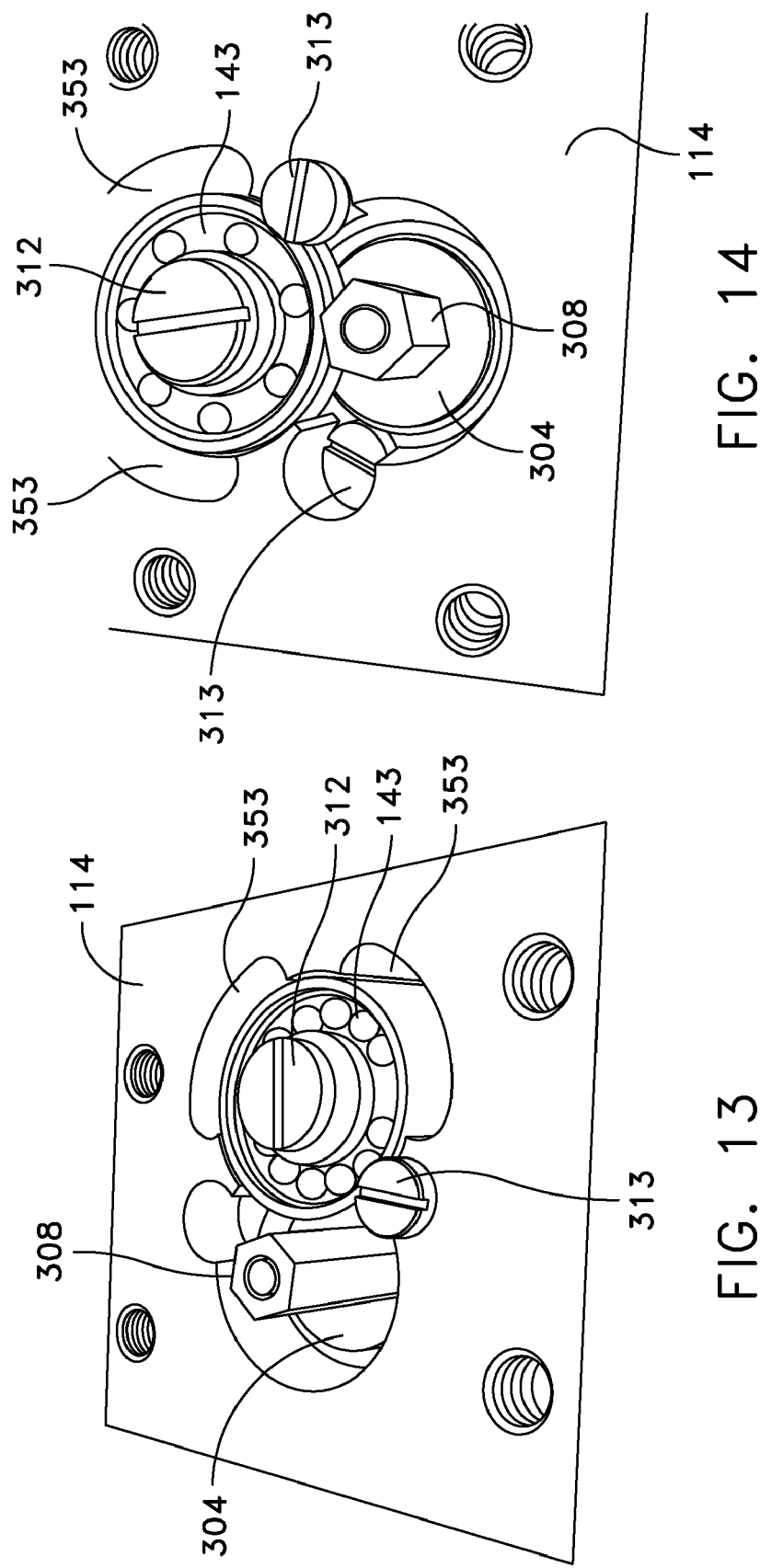

US 7,546,778 B2

FLOW METER

CROSS-REFERENCE TO RELATED APPLICATION

This application claims priority of U.S. patent application Ser. No. 60/897,952, entitled FLOW METER, and filed Jan. 29, 2007, the entire disclosure of which is hereby incorporated by reference as if being set forth in its entirety herein.

FIELD OF THE INVENTION

The present invention relates to measurement of flow rates of flowing media, and particularly to meters in which flowing media rotate one or more bodies, the rotation of which is detected for measurement of a rate of flow of the flowing media.

BACKGROUND OF THE INVENTION

A variety of meters are employed to measure the flow of flowing media, such as fluids and particulate matter. Certain meters detect the flow rate of flowing media by determining the number of rotations of one or more spindles or rotors having a generally helical blade that rotates in a chamber responsively to the media or fluid flowing through the chamber. The fluid movement causes the spindle to rotate in accordance with the flow rate. Such meters are generally known as axial flow meters. Axial flow meters have a variety of applications, including but not limited to measuring volumes of fuel dispensed at gasoline stations and other locations, and water volume measurements. Axial flow meters having two rotatable spindles with helical blades, mounted so that the helical blades of the two spindles interlock, are known, and are shown in U.S. Pat. No. 5,447,062 (Kopl, et al.), and U.S. Pat. No. 6,089,102 (Bloss), the entire disclosures of which are hereby incorporated by reference herein.

SUMMARY OF THE INVENTION

An exemplary embodiment of the invention is an axial flow meter which includes a generally elongated body having a continuous internal bore. A spindle is mounted in the housing and has a blade on the exterior surface of the spindle. A second spindle is mounted parallel to the first spindle and has a blade on the exterior surface of the spindle. The first and second spindles engage with each other via the blades on their exterior surfaces. Each of the spindles is engaged by a bearing on each end. At least one of the two bearings engaging the first and second spindles is in a fixed position in an axial direction relative to the housing. The axial flow meter may also include a sensor unit for sensing and measuring the rotation of at least one of the two spindles. In an embodiment, the housing has a cap at each end.

In an embodiment, a flow meter may include a first and a second plug abutting and substantially closing the openings in the two bearings engaging one of the spindles. A first plug may be in form of a plate. The flow meter may further include a sensor unit for detecting and measuring the rotation of at least one of the spindles. An embodiment of the sensor unit includes a magnet positioned at or near an end of a spindle and a detector unit adapted to detect changes in magnetic field output by the magnet. The detector unit is positioned in close proximity of the magnet.

An embodiment of the invention is method for measuring flow rate of a liquid through a housing. The method includes a step of flowing the liquid through the housing, and causing rotation of two spindles mounted in the housing. Both the spindles have a blade on their exterior surface to mesh with each other. A bearing engages each of the two ends of each of the two spindles. At least one of two bearings engaging each of the spindles is fixed in a position relative to the housing in an axial direction. The method further includes the steps of blocking the flow of liquid over one of the spindles using plugs abutting and substantially closing the openings of the two bearings engaging one of the two spindles and detecting and measuring the rotation of at least one of the spindles.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and:

FIG. 2 shows a plan view of an assembled flow meter of FIG. 1;

FIG. 3 shows a section, taken along line A-A of FIG. 2, of the flow meter of FIG. 1;

FIG. 4 shows an enlarged view of the portion of FIG. 3 designated at B;

FIG. 5 shows a plan view similar to FIG. 2 of an assembled flow meter according to an embodiment of the present invention;

FIG. 6 shows a section, taken along line C-C of FIG. 5, of the flow meter of FIG. 5;

FIG. 7 shows an enlarged view of the portion of FIG. 6 identified by line D;

FIG. 8 shows a section, taken along line E-E of FIG. 5, of the flow meter of FIG. 5;

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for the purpose of clarity, many other elements found in typical flow meters. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
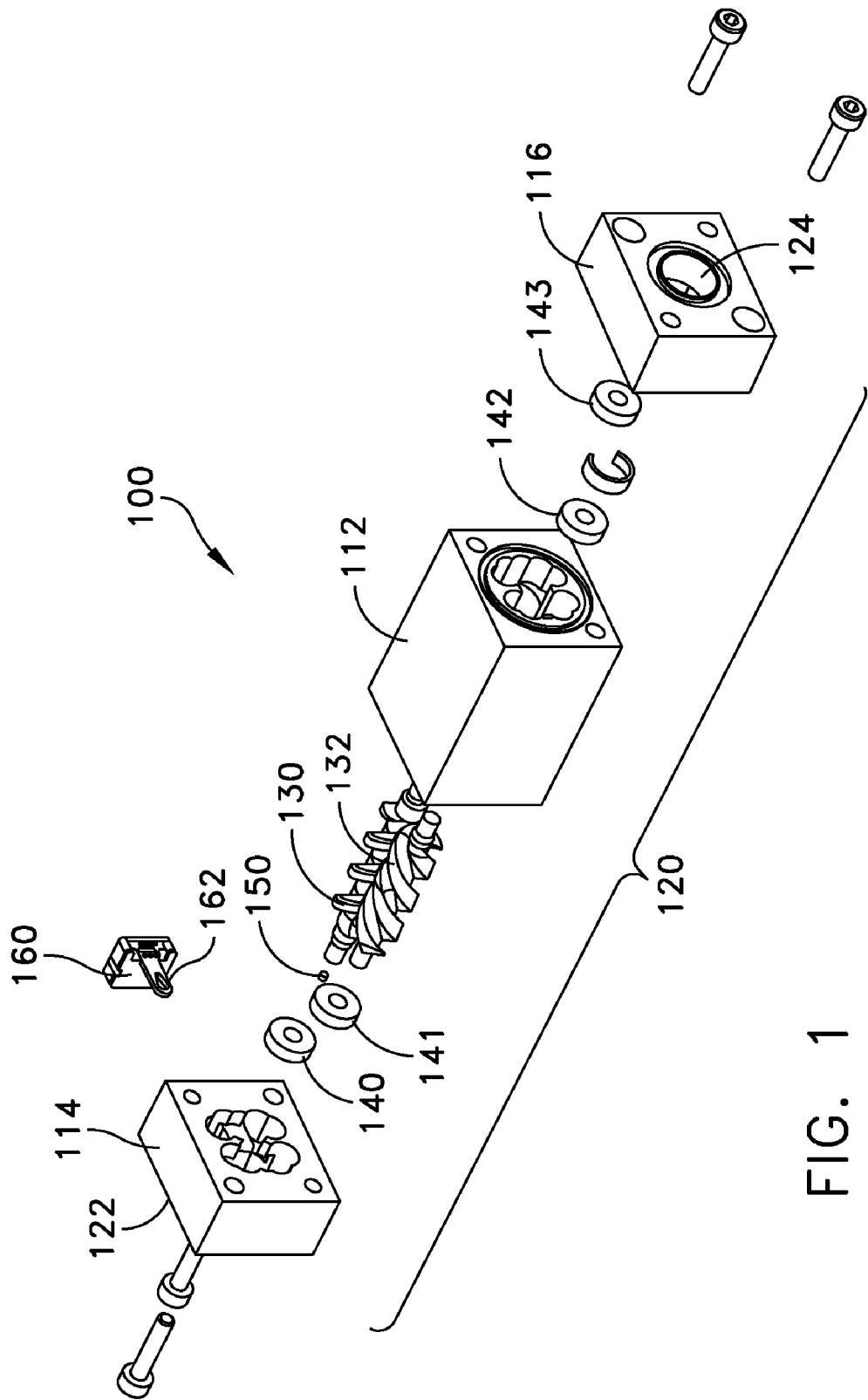
FIG. 1 shows an exploded view of a flow meter in accordance with an embodiment of the present invention.

FIG. 1 illustrates an exploded view of an exemplary flow meter, while FIG. 2 illustrates a plan view of the assembled flow meter of FIG. 1. As shown therein, axial flow meter 100 has a generally elongated body 112 having a continuous internal bore from one end to the other, a first end cap 114 situated at one end of body 112 and a second end cap 116 situated at an opposite end of body 112. Body 112, first end cap 114 and second end cap 116 together define a housing 120 having first port 122 at one end thereof and second port 124 at an opposite end thereof. Housing 120 has a continuous internal passageway between first port 122 and second port 124 and is impervious to a selected fluid media.

Housing 120 has a pair of screw spindles mounted to rotate freely about its axis. A screw spindle is an elongated rotor having an axle and at least one helical blade. The outer edges of the helical blade are generally in close proximity to the inner surface of housing 120, so that the screw spindles are rotated as fluid media flows from the first port to the second port. The axes of the screw spindles are generally aligned with the axis of housing 120 extending between the first and second ports. In the illustrated embodiment, housing 120 has two screw spindles 130, 132. Referring to FIG. 3, screw spindles 130, 132 are mounted to mesh and rotate together. As a result, measurement of the rotation of either screw spindle serves to measure the rotation of both. In this embodiment, each screw spindle 130, 132 is mounted at each end on bearings 140, 141, 142, 143, which may be ball bearings. Bearings 140, 141, 142, 143 are fixed in position in body 112.

It will be understood that a flow path is defined through housing 120 between first port 122 and second port 124, and that screw spindles 130, 132 are positioned to rotate freely, with edges of their blades in close proximity to an inner surface of housing 120, within body 112, thereby causing screw spindles 130, 132 to rotate when a flowing media moves through the flow path in either direction between first port 122 and second port 124.

The particular dimensions and specifications for spindles 130, 132, may be selected by those of ordinary skill in the art depending on factors such as viscosity characteristics of the fluid and rate of flow requirements.

Screw spindle 130 has a center line along its axis of rotation. Referring to FIG. 4, magnet 150 is positioned at or near one end of screw spindle 130. In another embodiment, magnet 150 may be positioned at or near one of screw spindle 132. Magnet 150 is so mounted and positioned so as to change the direction of the provided magnetic field as screw spindle 130 rotates. Magnet 150 may be rigidly mounted at or near an end of the axle of screw spindle 130. Magnet 150 may be mounted on screw spindle 130 so that the center line of screw spindle 130 passes through magnet 150. Magnet 150 may be aligned with the center line of screw spindle 130 so that the center of magnet 150 is substantially aligned with the center line of screw spindle 130. Spindle 130 may be positioned so that the magnet is positioned near or beyond an end of body 112.

Magnet 150 may be of any suitable shape, size and material to provide a magnetic field, changes in the direction of which can be detected by a suitably located sensor. By way of example, magnet 150 may be in the shape of a disk, although other shapes are possible. One of ordinary skill in the art may also select suitable materials for its fabrication. Examples of suitable materials include alloys of the Lanthanide group of elements, including samarium cobalt and neodymium iron boron, in either sintered or bonded form. Magnet 150 may be attached to spindle 130 in any suitable manner, such as by an adhesive, such as an adhesive that will not be dissolved by fluid traversing the interior of meter 100. The size of magnet 150 may vary according to the application and composition. For example, in one configuration, a cylindrically shaped magnet is used having a diameter less than the diameter of the spindle shaft and preferably less than one half the diameter of the shaft. In the illustrated embodiment, as best seen in FIG. 4, magnet 150 is in the form of a disk, and is partially received in a blind bore provided in an end surface of the axle of spindle 130 for diametrically magnetizing across the face of the shaft, thereby enabling a particular orientation (e.g. north-south orientation). Magnet 150 may optionally be located in a sleeve. By way of example, if spindle 130 is of ferrous material, magnet 150 may be located in a non-ferrous sleeve attached to and extending from the end face of the axle of spindle 130.

Referring still to FIGS. 3 and 4, a sensor unit 160 includes a sensor adapted to detect changes in the magnetic field output by magnet 150 with rotation of screw spindle 130. Sensor unit 160 may include a sensor 162 positioned, when flow meter 100 is assembled, in sufficiently close proximity to magnet 150 to permit detection of the changes in the field provided by magnet 150. The sensor may thus be adapted to detect changes in flow characteristics of the media by means of detecting at least one of direction and speed of the axial flow meter spindle or rotor. The location of sensor 162 may be selected by those of skill in the art depending on a variety of factors, including the location of magnet 150, the sensitivity of sensor 162, and the strength of the field provided by magnet 150. Referring to FIG. 4, in an embodiment in which magnet 150 is substantially aligned with a center line of screw spindle 130, sensor 162 may be positioned substantially in alignment with center line of screw spindle 130.

Sensor unit 160, including sensor 162, is preferably maintained free from contact with flowing media moving through flow meter 100. A barrier selected to be impermeable to a selected flowing medium is provided between the flow path between the first port and the second port, and sensor assembly 160, including sensor 162. One of ordinary skill in the art may select an appropriate barrier depending on the nature of the flowing medium.

Figure 9:
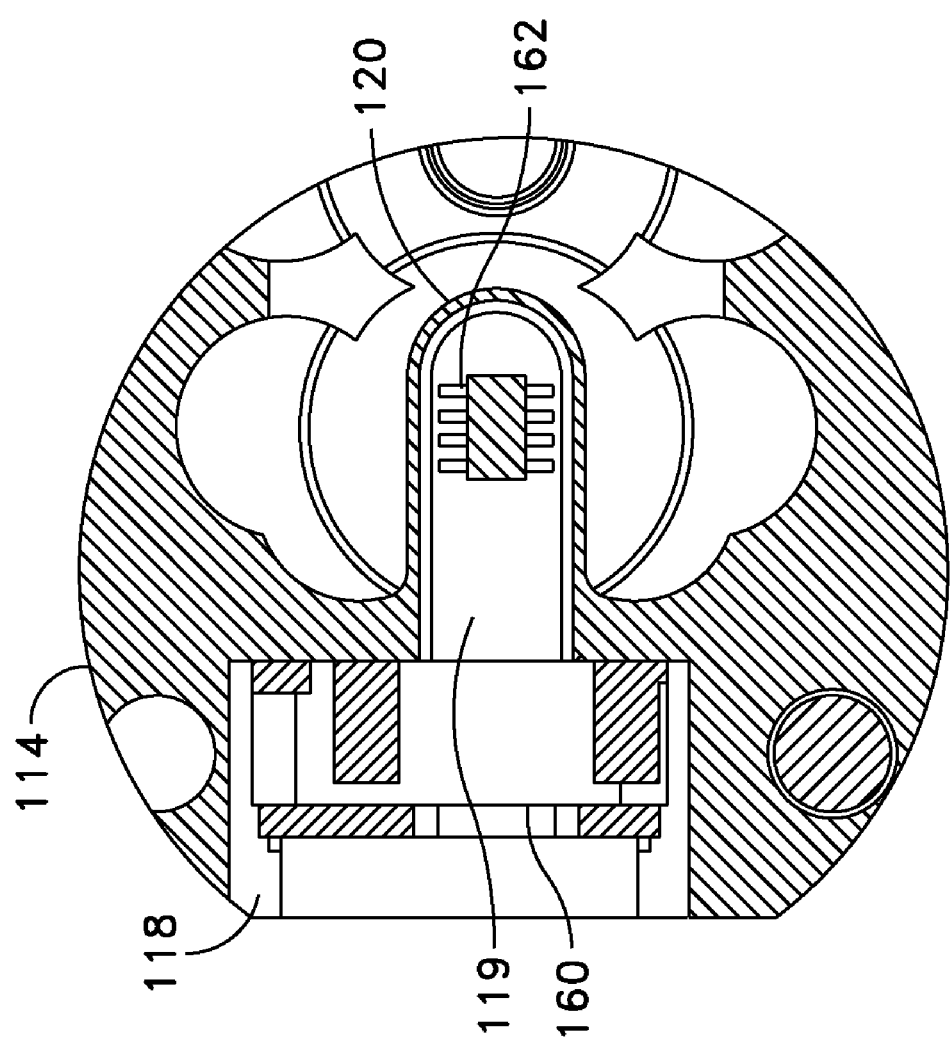
FIG. 9 shows an enlarged view of the portion of FIG. 8 identified by line F.

In the illustrated embodiment, a wall of the housing is positioned at one location so as to provide a chamber in proximity to magnet 150. In the illustrated embodiment, as seen for example in FIGS. 7 and 9, end cap 114 has an elongated wall portion 120 having an interior surface and an exterior surface. The elongated wall portion 120 defines a sensor chamber 119 therein located substantially in alignment with the center line of screw spindle 130. The elongated wall portion 120 is integrally formed in end cap 114. An electronics chamber 118, larger than and in communication with the sensor chamber, is provided for electronics associated with the sensor 162. In this embodiment, sensor 162 is located in the flow path of the flowing media, but is isolated from the flowing media by a continuous wall of material impervious to the flowing media, without any seam or seal.

In this exemplary embodiment, end cap 114 has a circumferential wall 115 having a continuous inner surface 116 and a continuous outer surface 117. A continuous surface, as used here, is made, such as by casting, machining or stamping, of a single piece, without joints or seals. Outer surface 117 is made up of three planar sides and a fourth side having defined therein electronics chamber 118 in the form of a well extending into outer surface 117. Electronics chamber 118 may have a substantially planar lower surface as shown. Sensor chamber 119 extends further from the lower surface of electronics chamber 118 toward and crossing the center line of spindle 130. Electronics chamber 118 is suitably dimensioned to receive sensor unit 160. Sensor chamber 119 is suitably dimensioned to receive detector 162 and arm 163 for providing physical support for and containing wiring for providing two-way data communication and furnishing of power to detector 162. The opposite side of inward extending portion from sensor chamber 119 is a portion of continuous inner surface 116.

As may be seen, referring, for example to FIG. 7, the sensor assembly 160 may be potted with electrically insulating and shock absorbing material 170 in both electronics chamber 118 and sensor chamber 119.

A variety of sensors may be employed as detector 162. In some embodiments, detector 162 is a Hall sensor. Hall sensors are commercially available with integrated electronics. The Hall sensor may be in the form of a linear Hall sensor, which will generally provide a sinusoidal output signal as the direction of the detected magnetic field is rotated. Alternatively, the Hall sensor may be in the form of a Hall switch selected to provide a signal that cycles between high and low either once or twice in each full rotation of the magnetic field. In some embodiments, a magnetoresistive sensor may be employed to detect the changes in the magnetic field direction as the spindle rotates. A variety of magnetoresistive sensors are commercially available, including magnetoresistive sensors with integrated signal conditioning circuits. Detector 162 may be packaged as an integrated circuit.

Sensor unit 160 may include one or more processors and memory devices for storing code that is executed by the one or more processors, and memory units for storing data. Such processors may include one or more programmable logic devices such as ASIC (Application Specific Integrated Circuit) devices, programmable gate arrays, and the like. Output signals may be transmitted along output wires, or wirelessly transmitted. The processor may take the form of a microprocessor, by way of example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Memory devices may be internal or external to the processor(s). As used herein, "memory" refers generally to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only.

A variety of data and signal processing operations may be executed in sensor unit 160. The operations may include, by way of example, conversion from spindle rotation data to volume and/or flow rate date, with correction for variations in the flow rate relative to the rotation of the spindle. For example, it has been observed that the flow rate is higher relative to the motion of the spindle at low flow rates than at high flow rates. Measurement of the rotation of the spindle results in providing a measurement of flow rate below the actual flow rate at low speeds, and/or above the actual flow rate at high speeds. Thus, the data processing operation may correct for the variation by adjusting the output volume by a factor dependent on the rotational speed of the spindle. The factor may be obtained from a look-up table, or calculated from a formula.

Data processing may also be used to determine a direction of flow. According to an embodiment of the present invention, the spindles may be free to rotate in a forward or backward direction. Data processing may be used to determine which way flow is occurring based on the direction a spindle is rotating.

Figure 10:
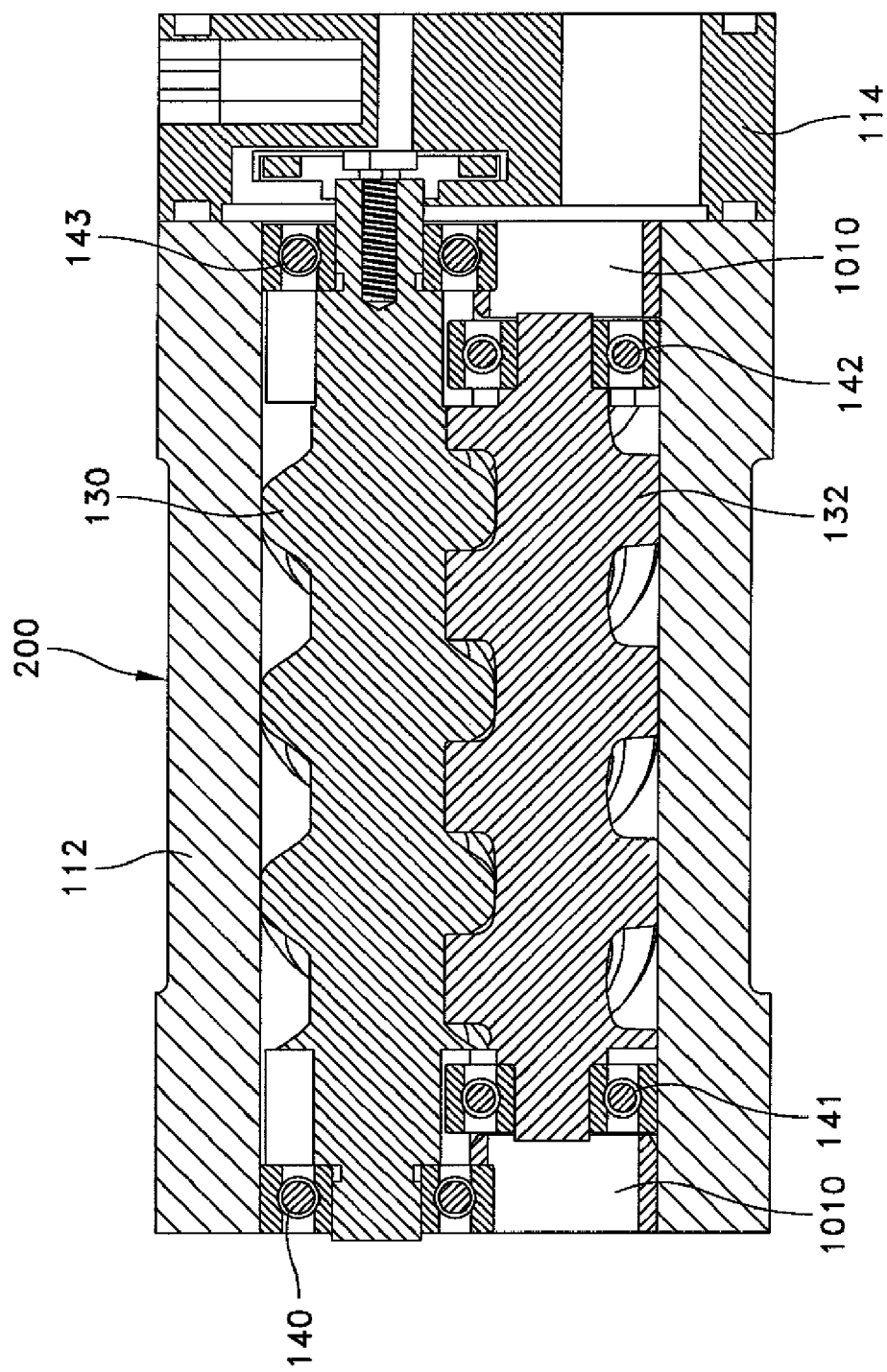
FIG. 10 shows a section of a prior art axial flow meter.

Referring now to FIG. 10, there is shown a sectional view of a portion of a prior art flow meter 200. Flow meter 200 has a generally elongated body 112 having a continuous internal bore from one end to the other, a first end cap 114 situated at one end of body 112 and a second end cap 116 situated at an opposite end of body 112. Flow meter 200 includes two spindles, a primary spindle 130 and a secondary spindle 132. On each end of the secondary spindle 132 is a hollow bearing retainer 1010 that allows fluid to flow through the bearings 140, 143 and down the secondary spindle 132. The hollow bearing retainers 1010 are sized so as to allow spindle 132 to float axially along the flow path. However, this configuration may reduce the accuracy of the meter 1010 in certain flow environments, such as during erratic flows and/or stop and go flow environments.

Figure 11:
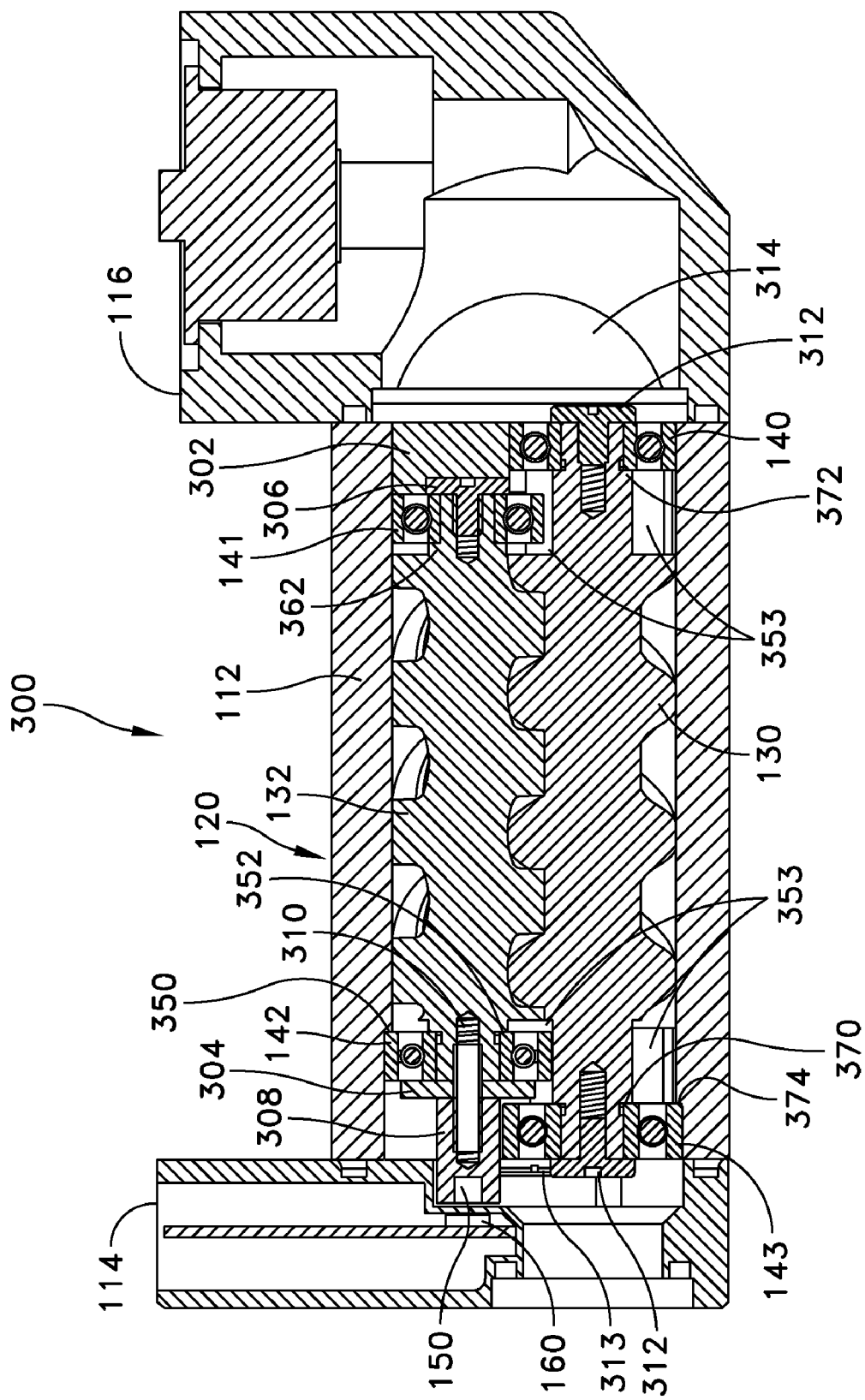
FIG. 11 show a section, analogous to that of FIG. 3, of another embodiment of flow meter according to aspects of the invention.

Referring now to FIG. 11, there is shown a sectional view of a portion of an exemplary flow meter 300 according to an aspect of the invention. Like flow meter 100, flow meter 300 has a housing 120 which includes a generally elongated body 112 having a continuous internal bore from one end to the other, a first end cap 114 situated at one end of body 112 and a second end cap 116 situated at an opposite end of body 112. Like flow meter 100, flow meter 300 includes two spindles, a primary spindle 130 and a secondary spindle 132. Spindles 130, 132 are mounted on bearings 141, 142,143 and 144 so that spindles 130, 132 may rotate freely. Bearings 141, 142, 143 and 144 may, for example, be ball bearings. Ball bearings have openings through which the liquid may flow. A plug 302 abuts all or substantially all of the openings of bearing 141 at an end of secondary spindle 132. Plug 302 serves to prevent fluid flow through bearing 141 and down the secondary spindle 132. A flat plate 304 abuts all or substantially all of the openings of bearing 142 at the other end of secondary spindle 132. Plate 304 also serves as a plug to prevent fluid from flowing through the bearing 142 and down the secondary spindle 132.

Referring still to FIG. 11, plug 302 may be composed of stainless steel, and include a recess for receiving the head of a screw or bolt 306 secured in the abutting end of spindle 132. Screw or bolt 306 may serve to secure bearing 141 in place. Spindle 132 may include a shoulder or step 362 proximate bearing 141. Step 362 may serve to secure bearing 141 in place. According to an embodiment of the present invention, bearing 141 may be secured between bolt 306 and step 362. Bearing 141, thus, cannot move axially relative to spindle 132.

Plate 304 may also be composed of stainless steel, and is secured to an abutting end of spindle 132 via a spacer 308. Spacer 308 may also be composed of stainless steel, for example. In the illustrated embodiment, the proximate ends of spacer 308 and spindle 132 have internal, threaded bores that receive a threaded rod 310, thereby securing plate 304 to spindle 132. Plate 304 may serve to secure bearing 142 in place. According to an embodiment of the present invention, body 112 may include an internal shoulder or step 350 proximate bearing 142. Step 350 may serve to secure bearing 142 in place. Likewise, spindle 132 may include a shoulder or step 352 proximate bearing 142. Step 352 may serve to secure bearing 142 in place. According to an embodiment of the present invention, bearing 142 may be secured between plate 304 and steps 350, 352. Bearing 142 is constrained so that it cannot move axially relative to housing 120 or spindle 132.

By retaining the bearings in the housing with a threaded configuration, axial movement of the spindles is mitigated, such that the accuracy of the meter during erratic flows and/or stop and go flow situations may be improved.

In the illustrated embodiment, screws or bolts 312 are threaded into the ends of spindle 130, and secure bearings 140, 143 in place relative to the spindle 130. According to an embodiment of the present invention, body 112 may have an internal shoulder or step 374 proximate bearing 143. Step 374 may secure bearing 143 in place. According to an embodiment of the present invention, spindle 130 may include a shoulder or step 370 proximate bearing 143. According to an embodiment of the present invention, bearing 143 may be secured between a bolt 312 and steps 370, 374. According to an embodiment of the present invention, spindle 130 may include a shoulder or step 372 proximate bearing 140. Step 372 may secure bearing 140 in place. According to an embodiment of the present invention, bearing 140 may be secured between a bolt 312 and step 372 and may not move axially relative to spindle 130.

For purposes of completeness references 353 refer to clearance areas in the aluminum housing to allow fluid to travel around the bearing. Fluid flow around the secondary spindle may be mitigated with the plugs and fluid flow around the primary spindle should be encouraged. Without these cutouts in the housing the fluid would be forced to travel through bearings 140, 143 creating a significant pressure drop.

Further, screw 313 can be used to hold a bearing in place. It is understood, however, that there may actually be multiple (e.g. two) screws that serve such a purpose, one for each spindle. Such screws may help prevent the spindles from traveling axially especially during times of dramatic changes in flow rate or when the flow starts and stops. Such screws may serve to hold the spindles firmly from an axially standpoint such that one end is also free to expand and contract to compensate for changes in the fluid temperature. The screws and shoulders in housing 120 are only on one end of housing 120. The interior surface of housing 120 at its other end 400 is a straight bore which allows bearings 140, 141 to move axially relative to housing 120 in response to expansion and contraction of spindles 130, 132 with temperature changes.

FIGS. 13 and 14 show end views of a device metering device according to an embodiment of the present invention. In particular, screws 313 and clearance areas 353 are shown in FIGS. 13 and 14. Also seen are bearing 143, spacer 308, plug 304 and screw 312 which engages a spindle.

A filter 314 is included to reduce particulate contamination at the bearings and spindles. Filter 314 may take the form of a stainless steel strainer, for example.

Figure 12:
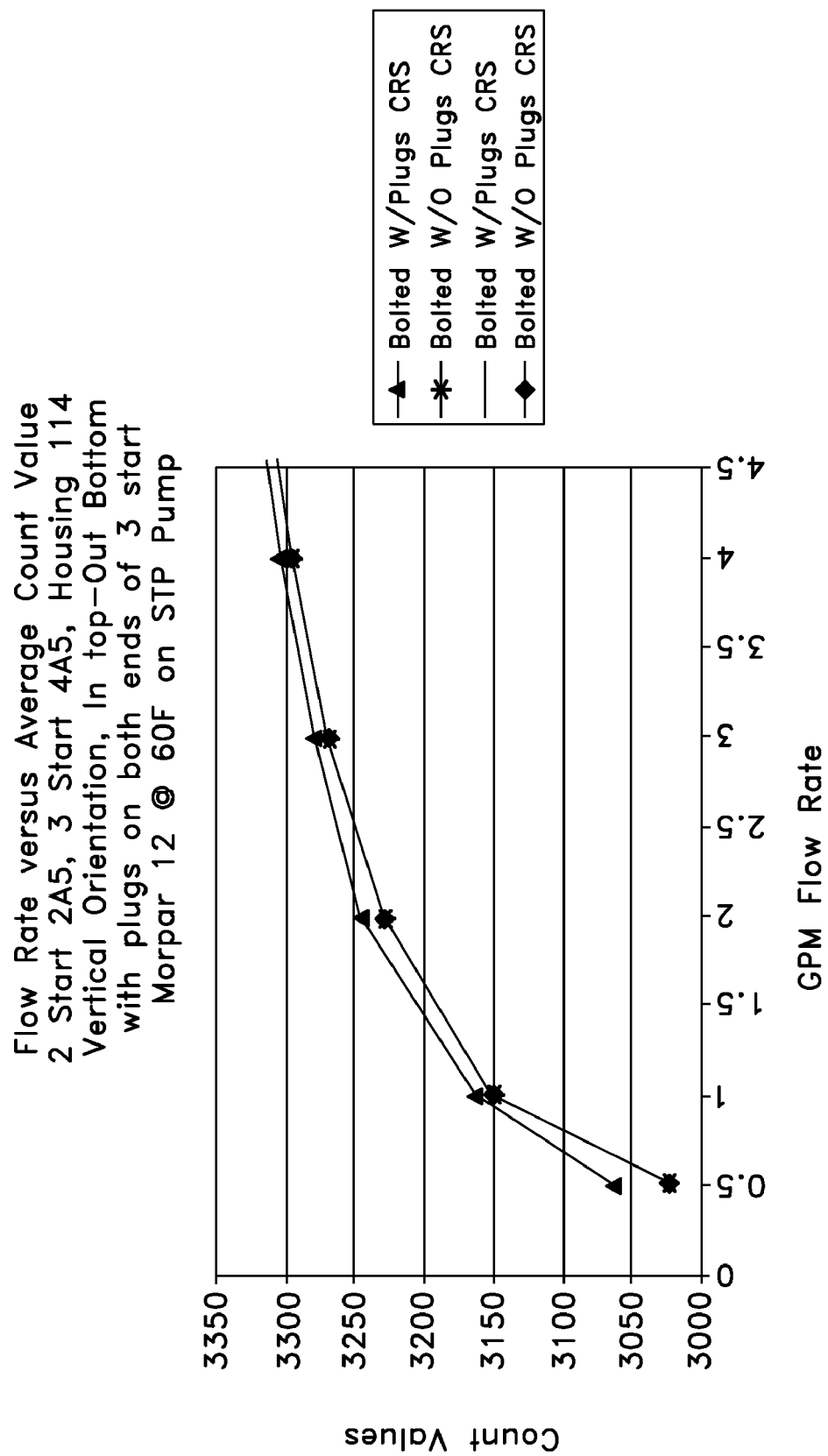
FIG. 12 shows a chart illustrating flow rates of axial flow meters both including and omitting plugs; and, FIGS. 13 and 14 show end views of a flow meter according to an embodiment of the present invention.

Referring now to FIG. 12, there is shown a chart illustrating various flow rates for bolted spindles, both with and without plugs. There are four sets of data shown, two with plugs and two without plugs. It can be seen that the two curves with plugs have higher count values—meaning the number of spindle rotations with the plugs was higher than those without the plugs. Accordingly, the meters with the plugs will measure more of a same amount of fluid traversing them. In other words, the spindles with the plugs rotated more, giving higher count values and allowing less blow by of the fluid under measurement resulting in a more accurate measured value.

The disclosed embodiment may be applied, by way of example, to measurement of the flow volume of liquids. It will be appreciated that flow volumes of other fluids may be measured, as well as flow rates of other flowing media, such as particulates including grains, minerals, pellets of plastic, and other materials, in accordance with various embodiments of the invention.

The foregoing description of the embodiments of this invention has been presented for purposes of illustration and description. It is not intended to be exhaustive or to limit the invention to the forms explicitly disclosed, as many modifications and variations are possible without departing from the scope and spirit of the present invention.

As an example, the teachings of the invention may be applied to a flow meter having a single rotor or spindle or triple rotors or spindles. Other designs of rotor or spindle, such as a design with fan blades, as opposed to helical blades, may be employed. The logic used in processing data may be varied. These and such other modifications and variations that may be apparent to a person skilled in the art are intended to be included within the scope of this invention.

What is claimed is:

1. An axial flow meter comprising:
 a housing comprising a generally elongated body having a continuous internal bore;
 a first spindle mounted in said housing, said first spindle having a first blade on the exterior surface of said first spindle;
 a second spindle mounted parallel to said first spindle in said housing, said second spindle having a second blade on the exterior surface of said second spindle, said second blade of said second spindle engaging with said first blade of said first spindle;
 a first and a second bearing engaging a first and a second end of said first spindle;
 a third and a fourth bearing engaging a first and a second end of said second spindle;
 each of said first and third bearings being in a fixed position in an axial direction relative to said elongated body; and
 a sensor unit for detecting and measuring the rotation of at least one of said first and second spindle.

2. The axial flow meter of claim 1, wherein said first and second blades are helical blades.

3. The axial flow meter of claim 1, further comprising a first and a second cap at a first and a second end of said body.

4. The axial flow meter of claim 1, further comprising a first plug abutting and substantially closing openings in said third bearing.

5. The axial flow meter of claim 4, wherein said first plug is a flat plate.

6. The axial flow meter of claim 4, further comprising a second plug abutting and substantially closing openings in said fourth bearing.

7. The axial flow meter of claim 1, wherein said sensor unit comprises:
 a magnet positioned at or near said first end of said first screw spindle; and
 a detector unit adapted to detect changes in magnetic field output by said magnet, said detector unit positioned in close proximity to said magnet.

8. The axial flow meter of claim 7, wherein said sensor unit further comprises:
 a processor; and
 a memory for storing data.

9. The axial flow meter of claim 1, further comprising a filter.

10. A method for measuring a flow rate of a liquid through a housing, the method comprising the steps of:
flowing the liquid through the housing, causing rotation of a first and a second spindles mounted in said housing, said first and second spindles each having a blade to mesh with each other, a first and a second bearing engaging a first and a second end of said first spindle and a third and a fourth bearing engaging a first and a second end of said second spindle, wherein at least said first and third bearings are substantially fixed in position relative to said housing;
blocking the flow of liquid through said third and fourth bearings; and
detecting the rotation of at least one of said first and second spindles.

11. The method of claim 10, wherein said step of blocking comprises the step of providing a first plug abutting and substantially closing openings in said third bearing.

12. The method of claim 11, wherein said step of blocking comprises the step of providing a second plug abutting and substantially closing an opening in said fourth bearing.

13. The method of claim 10, wherein said detecting step further comprises the step of detecting the change in magnetic field output by a magnet positioned at or near said first end of said first spindle.

14. An axial flow meter comprising:
a housing comprising a generally elongated body having a continuous internal bore;
a first spindle mounted in said housing, said first spindle having a first blade on the exterior surface of said first spindle;
a second spindle mounted parallel to said first spindle in said housing, said second spindle having a second blade on the exterior surface of said second spindle, said second blade of said second spindle engaging with said first blade of said first spindle;
a first and a second bearing engaging a first and a second end of said first spindle;
a third and a fourth bearing engaging a first and a second end of said second spindle;
a first and a second plug abutting and substantially closing openings in said first and second bearings; and
a sensor unit for detecting and measuring the rotation of at least one of said first and second spindle.

15. The axial flow meter of claim 14, wherein at least said first and third bearings are substantially fixed in a position relative to said housing in an axial direction.

16. The axial flow meter of claim 14 further comprising a sensor unit comprising:
a magnet positioned at or in close proximity of an end of said first spindle; and
a detector unit adapted to detect changes in magnetic field output by said magnet, said detector unit positioned in close proximity to said magnet.

* * * * *